United States Patent [19]

Hirs

[11] 4,021,279

[45] May 3, 1977

[54] METHOD OF FORMING GROOVE PATTERN

[75] Inventor: Gilles Gerardus Hirs, Overath-Marialinden, Germany

[73] Assignee: Stichting Reactor Centrum Nederland, Netherlands

[22] Filed: Sept. 18, 1975

[21] Appl. No.: 614,662

Related U.S. Application Data

[63] Continuation-in-part of Ser. No. 352,331, April 18, 1973, abandoned.

[30] Foreign Application Priority Data

Apr. 20, 1972 Netherlands .................. 7205289

[52] U.S. Cl. .................. 156/654; 156/345; 156/664
[51] Int. Cl.² .................................. C23F 1/02
[58] Field of Search .................. 156/7, 16, 18, 345

[56] References Cited

UNITED STATES PATENTS

| 3,043,362 | 7/1962 | Mennesson ................ 156/345 |
| 5,751,313 | 8/1973 | DiBenedetto et al. ............ 156/16 |

*Primary Examiner*—William A. Powell
*Attorney, Agent, or Firm*—Cushman, Darby & Cushman

[57] ABSTRACT

A method is given for obtaining recesses in a surface by etching. The obtained surface with recesses can be used for example in bearings.

According to the invention, an etching method is given, wherein the depth of the recesses is controlled by forcing an etching fluid along the surface to be etched by means of a flow guiding template in places defined by this template.

The etching rate in the recesses to be etched is controlled by adjustment of the flow velocity of the etching liquid and the slit height in the flow-guiding template.

The recesses to be etched are deeper when the flow velocity of the etching fluid and the slit height are both higher.

9 Claims, 7 Drawing Figures

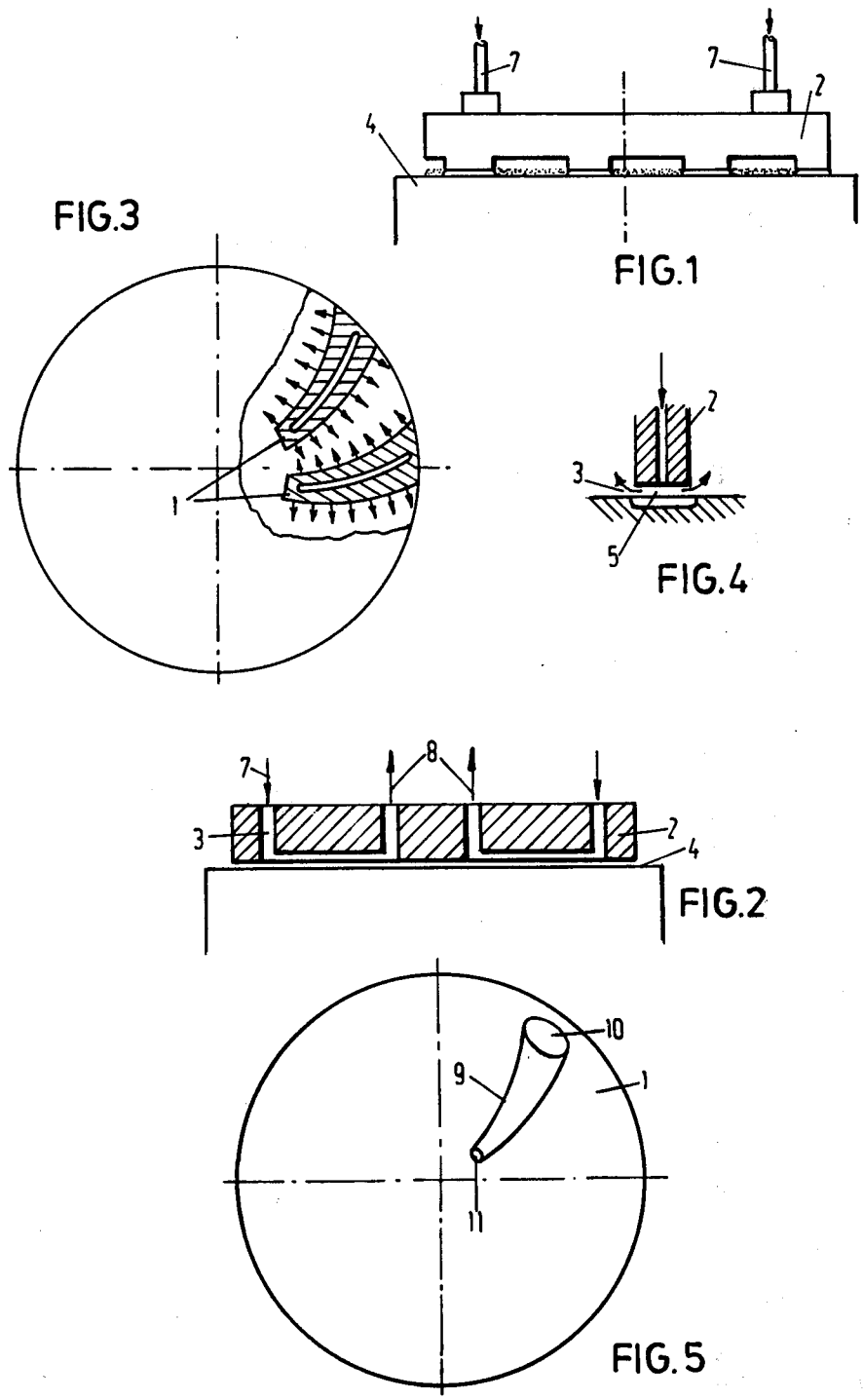

METHOD OF FORMING GROOVE PATTERN

This is a continuation-in-part of United States patent application Ser. No. 352,331, filed on Apr. 18, 1973, now abandoned.

The present invention relates to the production, by etching, of intricate shallow groove patterns such as loxodromic patterns on the surfaces of steel balls, which can be used as thrust bearings.

Steel balls with diameters between 2 and 8 millimeters can be obtained in great quantities in very narrow tolerances. When these balls are provided with shallow groove patterns, especially in a loxodromic pattern, they are excellently suited as part of thrust bearings.

It is a known fact in itself that a metal surface with recesses, obtained, for example, by etching to a depth of 0.001 to 0.003 inch, can be applied to a bearing for the passage of a shaft. In this bearing, the recesses are situated symmetrically with respect to raised portions. This bearing comprises an oil supply which discharges onto the shaft.

The fabrication of a hydrodynamic bearing with an intricate and shallow groove pattern is a highly difficult and expensive matter. For example, difficulties have been found to exist in those processes requiring the design or pattern template must be held on or against the surface being etched by pressure. It has been found that in these instances, the effect of the pressure will deform portions of the template forming the pattern and thus the effectiveness of the etching process. This difficulty increases as the size of patterns or grooves becomes very small such that very fine patterns of a high quality cannot be obtained.

Another problem that has been found revolves around the presence of gas bubbles or gas pockets within the area being etched, as for example, on the surface of the metal or within the etching fluid. As with pressure problems, the problems associated with the presence of gas intensify as the groove pattern becomes finer.

Further, numerous problems have been found to exist with photochemical masks, the most serious being the likelihood of a random pattern being formed.

The manufacture of groove patterns by means of the earlier etching method specifically involves performing two or more complicated partial operations, which are replaced according to the new method by one simple operation. The surprising feature of the present method is that one simple semi-continuous operation can now supersede two complicated partial operations without impairing in any way the quality of the groove pattern to be produced.

The principle partial operations according to the earlier method include:
1. marking and covering the surface in the area where no attack is to occur; and
2. the etching properly speaking of the places which are not masked.

According to the most usual method of fabrication, the surface is covered with a light-sensitive wax layer during the first partial operation, whereupon it is locally exposed and finally developed and locally washed. During the second partial operation, the surface is etched in the places which have first been washed. It may be said, therefore, that two etching operations are performed: once in the light-sensitive layer and once in the material proper. In the manufacture of a few items or small series, naturally it is of no interest to simplify this fabrication method or to replace it by another. In manufacturing very large series for industrial purposes, it is very definitely meaningful to replace the complicated two-step operations by one simple operation.

Known is a method for etching groove patterns in a surface. According to this known method, a stamp with respectively supplies and drains for etching fluid to spaces in the form of the groove pattern to be etched is carefully pressed against the surface.

This method, however, has the disadvantage that the stamp has to be pressed carefully against the surface. The purpose of this pressing is to insure that etching fluid does not leak outside of the groove pattern being etched. What is not recognized is that little or no etching will occur where the etching fluid has a flow velocity.

Another previously known method to determine the slit depth during etching of a groove pattern is a manometric measuring method. The etching depth is thereby measured by means of a process wherein the etching fluid is squirted against or alongside a surface, whereby the distance of the spouting mouth is determined by means of the hydraulic resistance of the slit. This resistance is then compared with the resistance of a standard orifice with respect to the unetched surface. This method has the disadvantage that much apparatus is needed.

The etching method according to the present invention is based on the recognition that the etching rate in the groove pattern to be etched can easily be controlled by adjusting the flow velocity of the etching fluid and the slit height of this recess.

At the same time theoretically it can be shown that it is possible to control in this way the etching rate. In practical cases, this etching rate has an order of magnitude of for example, 0.1 to 1 micron per second. The etching rate increases with increasing flow velocity of the etching fluid and with increasing slit height, the slit height being in the range of about 0.1 to about 0.5 mm.

Likewise it can be shown that a constant etching rate in the slit can be obtained when the cross section in longitudinal direction is adjusted.

This invention aims at providing a satisfactory and serviceable etching method for making bearings having intricate groove patterns. The new etching method is applicable to obtaining recesses in surfaces according to any desired shape, including, therefore, recessed surfaces rather than relatively narrow grooves and especially on the surfaces of balls.

According to the invention, etching liquid is caused to flow by means of a flow-guiding template onto areas determined by this template along the surface to be etched. Further, the use of the new method has great advantages as compared to earlier methods of etching in the quantity production of groove patterns according to an intricate shape.

One of the possible embodiments of the new etching process is explained hereinafter with the aid of the appended figures wherein:

FIG. 1 shows a cut-away side view of a template for use in etching a flat surface;

FIG. 2 shows a cross-sectional view taken along line 2—2 of the template and workpiece shown in FIG. 1;

FIG. 3 shows the flow path of etchant flow within the apparatus shown in FIG. 1;

FIG. 4 shows a cut-away side view of a template for use in etching surfaces;

FIG. 5 shows the flow path of etchant flow within the apparatus shown in FIG. 4;

Figure 6:
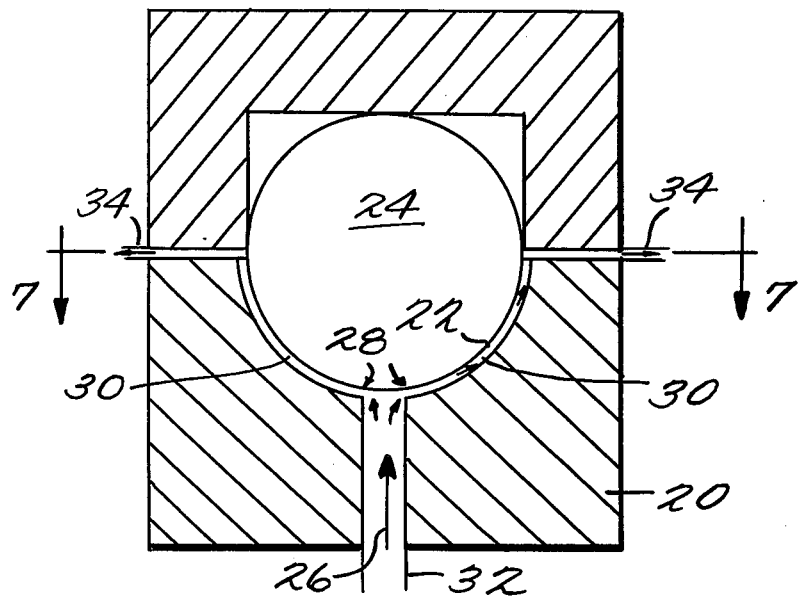
FIG. 6 shows a cut-away side view of a template for use in etching the surface of a ball.

Referring to FIGS. 1, 2 and 4, the groove pattern 1 is determined by the template 2. In FIG. 1, the template 2, from which etching liquid 3 flows, is supported at a short distance from a metal surface 4 which is to etched, and can be manufactured from synthetic material such as a phenolic resin like araldite, nylon or another workable material.

As shown in FIGS. 2 and 3, the etching liquid 3 is pressed between a slit 5 between the template 2 and the surface 4 which is to be etched, whereupon the liquid 3 flows out in directions perpendicular to the groove directions of the groove pattern 1 which is to be etched. While the etching liquid 3 is flowing into the slit 5, the metal surface 4 is being etched. The template 2 is made of a non-corrodible material (such as glass). After the etching fluid 3 has left the slit 5, the etching fluid is diluted as by flushing with water or otherise neutralized and/or discharged. The template 2 in these figures is equipped with supply pipes 7 for etching liquid 3.

According to FIGS. 4 and 5, which are likewise appended hereto, a constant etching rate is obtained by adapting the groove in the direction of flow. Flow of the etching fluid in the longitudinal direction of a groove pattern to be etched is furthermore a method which is more suitable for a more continuous process.

FIGS. 4 and 5 schematically give an example of a process in which the groove is narrowed in the direction of flow. In FIG. 4, the template 2 is formed as the mirror image of a groove pattern 1 (one groove 9 of which is shown horizontally) to be etched in a metal surface 4. The template 2, comprising supply and discharge pipes 7 and 8 for the etch liquid, is pressed against the metal surface 4 or maintained at a very short distance therefrom. The etching liquid 3 is supplied under a predetermined pressure to each groove 9 at the widest end 10, flows in the groove in the same direction as the groove itself, and is withdrawn by a discharge channel situated at the narrow end 11 of the groove. During its flow, material is locally removed from the surface to be etched. The declining groove width in the direction of flow is conductive to constancy of etching rate in the direction of flow. In some cases it is not necessary for the template and the surface to be etched to be butting accurately against each other; the measure of adjacency depends upon the demands made upon the groove pattern. However, the template pressure is only very slight and not sufficient to deform the template pattern. Even with etching liquid penetrating outside the groove between template and surface, the corrosive action outside the groove to be etched is negligible. This is to be attributed to the fact that the etching rate is small since there is no effective flow velocity and the concentration of the etching compound in the spilled film is low and the workpiece is not affected thereby.

It has been experimentally found to be possible to apply a groove pattern according to a predetermined pattern on a round ball. As shown in FIG. 6, the template 20 was adapted to a spherical surface 22 of a ball 24, and the etching liquid 26 flowed in the longitudinal direction of the grooves to be etched as shown by the arrows. It naturally is also possible to apply groove patterns with flow-guiding templates to cylindrical surfaces and to other curved surfaces.

The ball 24 being etched is supported a short distance from the template as by supports 28. Streamlined flow channels or canals 30 are provided in the template 20 which are the mirror image of the groove pattern desired to be formed. Template 20 also has suitable etchant supply and discharge pipes 32 and 34 respectively, which are connected to the canals 30 as shown so as to allow the etching agent to be flowed through canals 30.

Figure 7:
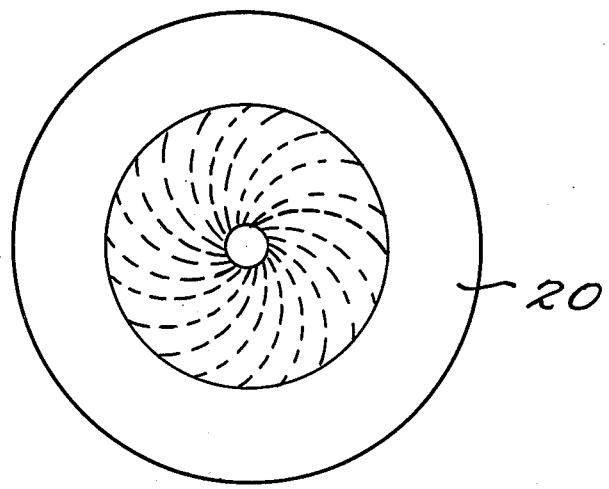
FIG. 7 shows a cross-sectional view taken along line 7—7 of FIG. 6.

FIG. 7 shows a cross-sectional view taken along line 707 in FIG. 6 and specifically shows a groove pattern in the form of loxodromes.

A loxodrome is a curve which occurs in mathematics and in navigation on the world sphere. A loxodrome is a curve on a ball surface which makes in every point a constant angle with a meridian and lines on the surface perpendicular to the meridians. Near the equator the separate loxodromes are nearly right lines.

Near the 'poles' the loxodromic pattern shown in FIG. 7 which is used for lubrication purposes has a very curved formed. Near the poles the loxodromes are very near to each other. At the poles the loxodromes intersect each other.

It is very important for lubrication purposes that the separate loxodromic grooves are separated by unbroken ridges which can now be accomplished by the present invention.

As was mentioned above, the slit height or space is about 0.1 to about 0.5 mm. The linear velocity of the etchant is about 0.5 to 10.0 meters per second, while the viscosity of the etchant ranges from about $10^{-3}$ to $5.10^{-3}$ N.s.m. . Thus with 10–45% $FeCl_3$, having a fluid density of 1.085–1.490 , the critical Reynolds number is from about 100 to 1000 . It is preferred, however, to generally have the Reynolds number lower than 1000.

It has been found that by employing a flow condition where the Reynolds number is under 1000 that a laminar flow can be maintained thus allowing a more precise etching operation. Further, the etching process is more readily controlled. This is because a non-laminar or turbulent flow cannot be controlled since the occurrence of local vortices will cause unequal etching and thus the groove formed thereby will not exhibit the desired pattern. In addition, the temperature of the etchant ranges between 15° and 75° C. The depth of the grooves being etched is preferably controlled by the length of time the process is allowed to continue. Operating under combinations of the above process conditions and dependant upon the groove depth desired, processing time range between 10 seconds to about 5 minutes.

Steel balls were degreased with trichloroethylene; some trichloroethylene that adhered to the balls was subsequently evaporated. The degreased balls were thereafter clamped in a flow guiding template and at room temperature etched with a 40% $FeCl_3$ solution and subsequently flushed with filtered tap water. The velocity of the etching liquid in the canals of the flow guiding template was about 1 meter per second.

The sum of the time spans of the etching and flushing operation was 210 seconds. This total time span is highly dependable from the constructive form of the templates and the flow system of the etching and flushing liquid.

It is therefore advisable to use a flow-guiding template which is streamlined as much as possible in order to obtain an almost laminar flow of the etching liquid.

Choice of the right viscosity of the etching fluid is in this case of equal importance.

A very serviceable etching agent for low-alloy steel is an aqueous solution of $FeCl_3$ (ferric chloride), having a viscosity range equal to about that of water to about twice the viscosity of water, with a solution concentration of about 10–50% by weight. Ball-bearing steel can be eminently provided with grooves with the aid of $FeCl_3$ solution or dilute cold nitric acid solution. In manufacturing pivot bearings, steel balls are frequently provided with grooves. It is furthermore possible to provide virtually any other metal surface with grooves.

With the use of an aqueous, not particularly agressive etching agent, use may be made of plastic templates. Without in any sense restricting the scope, it is now possible to present a listing of design principles pertaining to devices for fabricating groove patterns, as follows:

1. The templates are made of a non-corrodible material, such as glass, plastic, precious metal (e.g., gold).
2. The templates comprise supply and outlet openings for the etching agent.
3. The supply and outlet passages are so arranged that an appreciable flow of etching agent is maintained in places where the grooves are to appear.
4. The template can be designed in a number of ways, the most extreme forms being sketched in FIGS. 1 through 5:
   a. In FIGS. 1, 3 and 4, the flow is substantially perpendicular to the groove direction, and the outgoing etching liquid is diluted, washed away, neutralized or drained off;
   b. In FIGS. 2 and 5, the convective flow is substantially in the direction of the groove, and the convection is retarded with the aid of the walls in those places where no etching is to occur.
5. The etching rate must be constant; this is attained by adapting the flow rate in the direction of flow by adjusting the flow channel (slit height and/or groove width). p0 6. The etching liquid must not heat up, or hardly so; cooling, thermosetting.
7. The reaction velocity of the etching liquid with the material must be high with respect to the flow rate of the etching liquid.
8. Formation of colloid or gas bubbles is to be avoided by the proper selection of the etching liquid, with respect to temperature and composition; examples: $FeCl_3$; cold dilute nitric acid.
9. The volume of etching liquid can be so dispensed, possibly from groove to groove, that exactly the correct groove depth is obtained.
10. Besides the amount of etching liquid, measurements could also be made of the difference in concentration of the corroded material in the etching liquid before and after the etching operation.
11. The velocity of the etching process can also be regulated by controlling the difference in pressure of the etching liquid before and after the etching operation.
12. The pressure level of the etching liquid can be raised during the etching operation for suppressing the formation of gas bubbles and for keeping the gaseous reaction products in solution.

What is claimed is:

1. A method of etching a surface groove pattern in the homogeneous material surface of a ball comprising the steps of: supporting an undeformable, incompressible and noncorrodible template at a short distance from said ball surface in the area corresponding to where a surface pattern constituting a groove pattern is desired to be formed when the template is provided with canals according to the desired pattern, flowing an etching liquid through said canals in the template along the ball surface in a laminar flow path, wherein the short distance between the template into which said canals are formed and the ball surface simultaneously minimizes the effect of said etching liquid flowing between the template and the ball surface away from said canals, by limiting the length and effective flow velocity of the etching liquid flowing away from said canals.

2. A method according to claim 1 wherein the etching liquid is aqueous ferric chloride etching solution of a concentration between 10 and 50 weight percent at a temperature between about 15° and 75° C, etching liquid velocity being between about 0.5 and 10 meters per second and etching times between 10 second and 5 minutes.

3. A method according to claim 2 wherein the groove pattern is a loxodromic pattern, said ball having a diameter between 2 and 8 millimeters.

4. A method of etching a surface as claimed in claim 1 wherein said groove pattern is formed along the direction of the laminar flow of said etching fluid.

5. A method of etching a surface as claimed in claim 1 wherein the etching rate is from 0.1 to 1 microns per second.

6. A method of etching a surface as in claim 2 wherein the surface of the ball being etched is comprised of metal.

7. A method of etching a surface as in claim 6 wherein said metal is steel.

8. A method of etching a surface as in claim 1 wherein the short distance between the template and the ball surface ranges between about 0.1 mm and about 0.5 mm.

9. A method of etching a surface as in claim 1 wherein the etching liquid has a viscosity ranging between about $10^{-3}$ and about $5.1^{-3}$ N.s.m.

* * * * *